(12) United States Patent
Drapala et al.

(10) Patent No.: US 9,558,119 B2
(45) Date of Patent: Jan. 31, 2017

(54) MAIN MEMORY OPERATIONS IN A SYMMETRIC MULTIPROCESSING COMPUTER

(75) Inventors: Garrett M. Drapala, Poughkeepsie, NY (US); Pak-Kin Mak, Poughkeepsie, NY (US); Arthur J. O'Neill, Jr., Poughkeepsie, NY (US); Craig R. Walters, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 12/821,540

(22) Filed: Jun. 23, 2010

(65) Prior Publication Data

US 2011/0320737 A1 Dec. 29, 2011

(51) Int. Cl.
G06F 12/08 (2016.01)

(52) U.S. Cl.
CPC ....... *G06F 12/0828* (2013.01); *G06F 12/0831* (2013.01)

(58) Field of Classification Search
CPC .......................... G06F 12/0828; G06F 12/0831
USPC .......................... 711/130, 143, 152, E12.038
See application file for complete search history.

(56) References Cited

U.S. PATENT DOCUMENTS

| | | | |
|---|---|---|---|
| 6,192,451 B1 | 2/2001 | Arimilli et al. | |
| 6,625,698 B2 | 9/2003 | Vartti | |
| 6,763,435 B2 | 7/2004 | Arimilli et al. | |
| 6,832,300 B2 | 12/2004 | Naffziger et al. | |
| 7,120,762 B2 | 10/2006 | Rajwar et al. | |
| 7,233,976 B2 | 6/2007 | Thompson et al. | |
| 2002/0019921 A1* | 2/2002 | Hagersten et al. | 711/205 |
| 2002/0095554 A1* | 7/2002 | McCrory | G06F 12/0815 711/144 |
| 2004/0139287 A1* | 7/2004 | Foster | G06F 9/5016 711/153 |
| 2006/0047913 A1 | 3/2006 | Bigelow et al. | |
| 2006/0064518 A1* | 3/2006 | Bohrer | G06F 13/28 710/22 |
| 2008/0147986 A1* | 6/2008 | Chinthamani | G06F 12/0831 711/141 |
| 2009/0006784 A1 | 1/2009 | Takeuchi | |
| 2009/0100225 A1* | 4/2009 | Matsuki | 711/118 |
| 2009/0157965 A1 | 6/2009 | Shum et al. | |
| 2009/0157967 A1 | 6/2009 | Greiner et al. | |
| 2009/0193232 A1* | 7/2009 | Watanabe | 712/205 |

(Continued)

*Primary Examiner* — Edward Dudek, Jr.
(74) *Attorney, Agent, or Firm* — Brandon C. Kennedy; Margaret Pepper; Kennedy Lenart Spraggins LLP

(57) ABSTRACT

Main memory operation in a symmetric multiprocessing computer, the computer comprising one or more processors operatively coupled through a cache controller to at least one cache of main memory, the main memory shared among the processors, the computer further comprising input/output ('I/O') resources, including receiving, in the cache controller from an issuing resource, a memory instruction for a memory address, the memory instruction requiring writing data to main memory; locking by the cache controller the memory address against further memory operations for the memory address; advising the issuing resource of completion of the memory instruction before the memory instruction completes in main memory; issuing by the cache controller the memory instruction to main memory; and unlocking the memory address only after completion of the memory instruction in main memory.

15 Claims, 10 Drawing Sheets

(56) References Cited

U.S. PATENT DOCUMENTS

2011/0282875 A1* 11/2011 Atkins .............. G06F 17/30463
  707/737
2011/0314227 A1* 12/2011 Blake ................... G06F 12/127
  711/130

* cited by examiner

MAIN MEMORY OPERATIONS IN A SYMMETRIC MULTIPROCESSING COMPUTER

BACKGROUND OF THE INVENTION

Field of the Invention

The field of the invention is data processing, or, more specifically, methods, apparatus, and products for main memory operations in a symmetric multiprocessing ('SMP') computer.

Description of Related Art

Contemporary high performance computer systems are typically implemented as SMP computers. SMP is a multi-processor computer hardware architecture where two or more, often many more, identical processors are connected to a single shared main memory and controlled by a single operating system. Most multiprocessor systems today use an SMP architecture. In the case of multi-core processors, the SMP architecture applies to the cores, treating them as separate processors. Processors may be interconnected using buses, crossbar switches, mesh networks, and the like. In addition to shared main memory access, each processor also accelerates memory access with cache memory. Cache architectures are typically multi-level. Caches can be local to each processor, shared across more than one processor, or even shared across compute nodes in a multi-node architecture.

Traditional multi-level cache architectures are configured so that requests are forwarded from one level of cache to the next, busying system resources at they traverse the hierarchy for the duration of any memory operation for two main reasons: (1) simplification of system interlocks and protocols and (2) simplification of hardware design and implementation. While the traditional approach to request handling has been acceptable for normal processor fetch type operations as the request completion follows the data movement and limitations in the number of fetches initiated by all cores is bound by the number of L1/L2 fetch state machines. For high bandwidth fetch operations that ultimately require main memory access, this extra delay in interlock response times and resource availability actually reduces the overall throughput capability of the system. Moreover, as the latency from processor to main storage has increased from generation to generation, while with the number of intervening cache levels and the number of resources within each cache level has remained relatively constant (on a per processor basis), the cascading effects of request response time on resource availability starts to become problematic for memory operations that require main memory access.

SUMMARY OF THE INVENTION

Methods, apparatus, and computer program products for main memory operation in a symmetric multiprocessing computer, the computer comprising one or more processors operatively coupled through a cache controller to at least one cache of main memory, the main memory shared among the processors, the computer further comprising input/output ('I/O') resources, including receiving, in the cache controller from an issuing resource, a memory instruction for a memory address, the memory instruction requiring writing data to main memory; locking by the cache controller the memory address against further memory operations for the memory address; advising the issuing resource of completion of the memory instruction before the memory instruction completes in main memory; issuing by the cache controller the memory instruction to main memory; and unlocking the memory address only after completion of the memory instruction in main memory.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
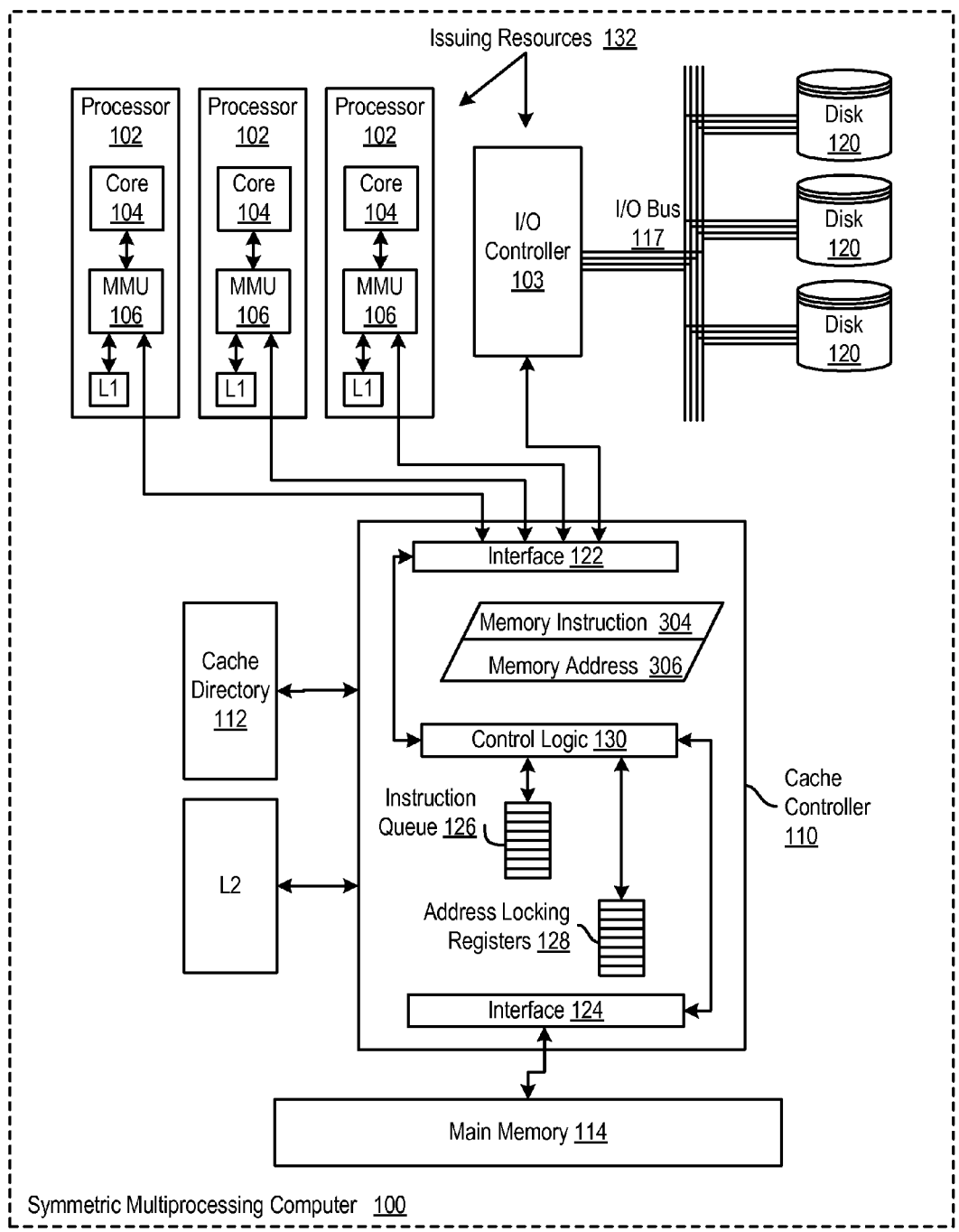
FIG. 1 sets forth a functional block diagram of an example of an SMP computer that conducts main memory operations according to embodiments of the present invention.

Example methods, apparatus, and computer program products for main memory operations in a symmetric multiprocessing ('SMP') computer according to embodiments of the present invention are described with reference to the accompanying drawings, beginning with FIG. 1. FIG. 1 sets forth a functional block diagram of an example of an SMP computer (100) that conducts main memory operations according to embodiments of the present invention. "Main memory operations," as the term is used here, generally indicates memory operations that requiring writing data directly to main memory, with or without reference to cache storage. Examples of main memory operations that effect writes to main memory include string copies, cache purge instructions, IBM zSeries Move Character Large ('MVCL') commands, Direct Memory Access ('DMA') operations by peripheral devices, other non-DMA I/O operations by peripheral devices, and so on. Such instructions in the example of FIG. 1 are carried out by cache controller, although the instructions may or may not access cache storage as such. Purge operations read from cache to store in main memory. I/O stores from peripherals, aligned MVCLs, and the like, do not.

In the example of FIG. 1, the SMP computer (100) includes several processors (102) operatively coupled through a cache controller (110) to a cache (L2) of main memory. The number of computer processors is illustrated here as three, but this is for ease of explanation, not for limitation. Readers will recognize that an SMP computer that carries out main memory operations according to embodiments of the present invention can include many processors. The computer (100) also includes a main memory (114), some of the contents of which are stored in cache (L1, L2). The main memory (114) is shared among the processors. The computer also includes input/output ('I/O') resources represented here by an I/O controller (103), an I/O bus, and disk storage (120). Further examples, not shown here, of I/O resources that can effect main memory operations according to embodiments of the present invention include:

- disk drive adapters including Integrated Drive Electronics ('IDE') adapters, Small Computer System Interface ('SCSI') adapters, and others,
- I/O adapters for computer display screens and user input devices such as keyboards and mice,
- video adapters, which represent I/O adapters specially configured for operation of a graphic display device such as a display screen or computer monitor,
- communications adapters for data communications with other computers and for data communications with data communications networks, such as RS-232 adapters, Universal Serial Bus ('USB') adapters, Ethernet adapters for wired data communications, and 802.11 adapters for wireless data communications,
- and the like.

Each processor (102) in the example of FIG. 1 includes a compute core (104) that is coupled for memory operations through a memory management unit ('MMU') (106) to a high level cache (L1), through the MMU and a cache controller (110) to a low level cache L2, and to main memory (114). L1 is a relatively small, high speed cache fabricated into the processor itself along with the MMU and the processor core. The MMU (106) includes address translation logic, a translation lookaside buffer, controls for the on-processor cache L1, and so on. The main memory (114) is the principal, random access store of program data and program instructions for data processing on the computer (100). Main memory (114) is characterized by memory latency, the time required for a memory access, a read or write to or from main memory. In this example, main memory (114) represents a single extent of physical address space.

The caches L1 and L2 are specialized segments of memory used by the processors (102) to reduce memory access latency. Each cache is smaller and faster than main memory, and each cache stores copies of data from frequently used main memory locations. In the example of FIG. 1, caches L1 and L2 implement a multi-level cache with two levels. Multi-level caches address the tradeoff between cache latency and hit rate. Larger caches have better hit rates but longer latency. To address this tradeoff, many computers use multiple levels of cache, with small fast caches backed up by larger slower caches. Multi-level caches generally operate by checking the smallest Level 1 (L1) cache first; if it hits, the processor proceeds at high speed. If the smaller cache misses, the next larger cache (L2) is checked, and so on, before main memory is checked. The example computer of FIG. 1 implements two cache levels, but this is only for ease of explanation, not for limitation. Many computers implement additional levels of cache, three or even four cache levels.

The cache directory (112) is a repository of information regarding cache lines in the caches. The directory records, for each cache line in all of the caches on a compute node, the identity of the cache line or cache line "tag" and the cache line state, MODIFIED, SHARED, INVALID, and so on. The MMUs (106) and the cache controllers (110) consult and update the information in the cache directory with every cache operation on a compute node. The cache controller (110), connected directly to L2, has no direct connection to L1—and obtains information about cache lines in L1 from the cache directory (112).

The cache controller (110) is a logic circuit that manages cache memory, providing an interface among processors (102), caches, and main memory (114). Although the cache controller (110) here is represented externally to the processors (102), cache controllers are often integrated on modern computers directly into a processor or an MMU. In this example, the MMUs (106) in fact include cache control logic for the L1 caches. The cache controller (110) in this example includes cache control logic (130) that is operatively coupled to communications interfaces (122, 124), an instruction queue (126), and address locking registers (128). The cache controller (110) receives main memory instructions from issuing resources (132) through interface (122). The cache controller communicates memory instructions and data to the main memory (114) through interface (124).

The example computer (100) of FIG. 1 carries out main memory operations according to embodiments of the present invention generally as follows. The cache controller (110) receives from an issuing resource (132) a memory instruction (304) for a memory address (306). The memory instruction is of a kind that requires writing data to main memory. The issuing resource (132) can be any computer component that issues memory instructions that require writes to main memory (114), a processor (102), an I/O controller (103), and so on. Upon receiving the memory instruction, the cache controller (110) locks the memory address against further memory operations for the memory address. In this example, the cache controller uses one of its address locking registers (128) to lock the address. The address locking registers are small, fast, storage locations that are local to the cache controller. The fact that a memory address is stored in one of the address locking registers represents the locking of that address against further memory operations against that address until the lock is removed—although the lock does not inhibit the current memory operation. The cache controller locks the memory address (306) by writing the address into one of the address locking registers (128).

The cache controller (110) then advises the issuing resource (132) of completion of the memory instruction (304) before the memory instruction completes in main memory. The cache controller then issues the memory instruction (304) to main memory (114). In this sequence of events, the cache controller advises of instruction completion before the instruction is even issued to main memory. These steps could be done the other way round. The cache controller could be configured to issue the instruction to main memory and then advise the issuing resource (132) of completion of the memory instruction before the memory instruction completes in main memory. The earlier advice to the issuing resource is probably preferred, however, because it frees the issuing resource to continue its own operations and therefore further reduces overall main memory latency. The cache controller unlocks the memory address, by deleting it from the address locking register where it is stored, only after completion of the memory instruction in main memory.

It is possible that an issuing resource (132) can issue another main memory instruction, requiring writing to main memory, for the same memory address (306) while the memory address is still locked, that is, before completion of a previous main memory instruction (304) against the same memory address (306). In embodiments, the cache controller is configured in different ways to handle this sequence of events. In some embodiments, the cache controller (110), upon receiving a main memory instruction for a memory address while the memory address is locked, rejects the additional memory instruction, by, for example, triggering a memory fault interrupt to the issuing resource. In such a sequence, the issuing resource will have to reissue the memory instruction later. In other embodiments, the cache controller (110), upon receiving an additional main memory instruction for a memory address while the memory address is locked, enqueues, in its instruction queue (126), for example, the additional memory instruction in the cache controller while the memory address remains locked and issues the additional memory instruction to the main memory only after unlocking the memory address, that is, after the previous memory instruction against the same memory address (306) has been completed in main memory (114). Having unlocked the memory address, the cache controller will now relock the same memory address, again advise of early completion, issue the additional memory instruction to main memory, unlock the memory address only after completion of the additional memory instruction in main memory, and so on.

Figure 2:
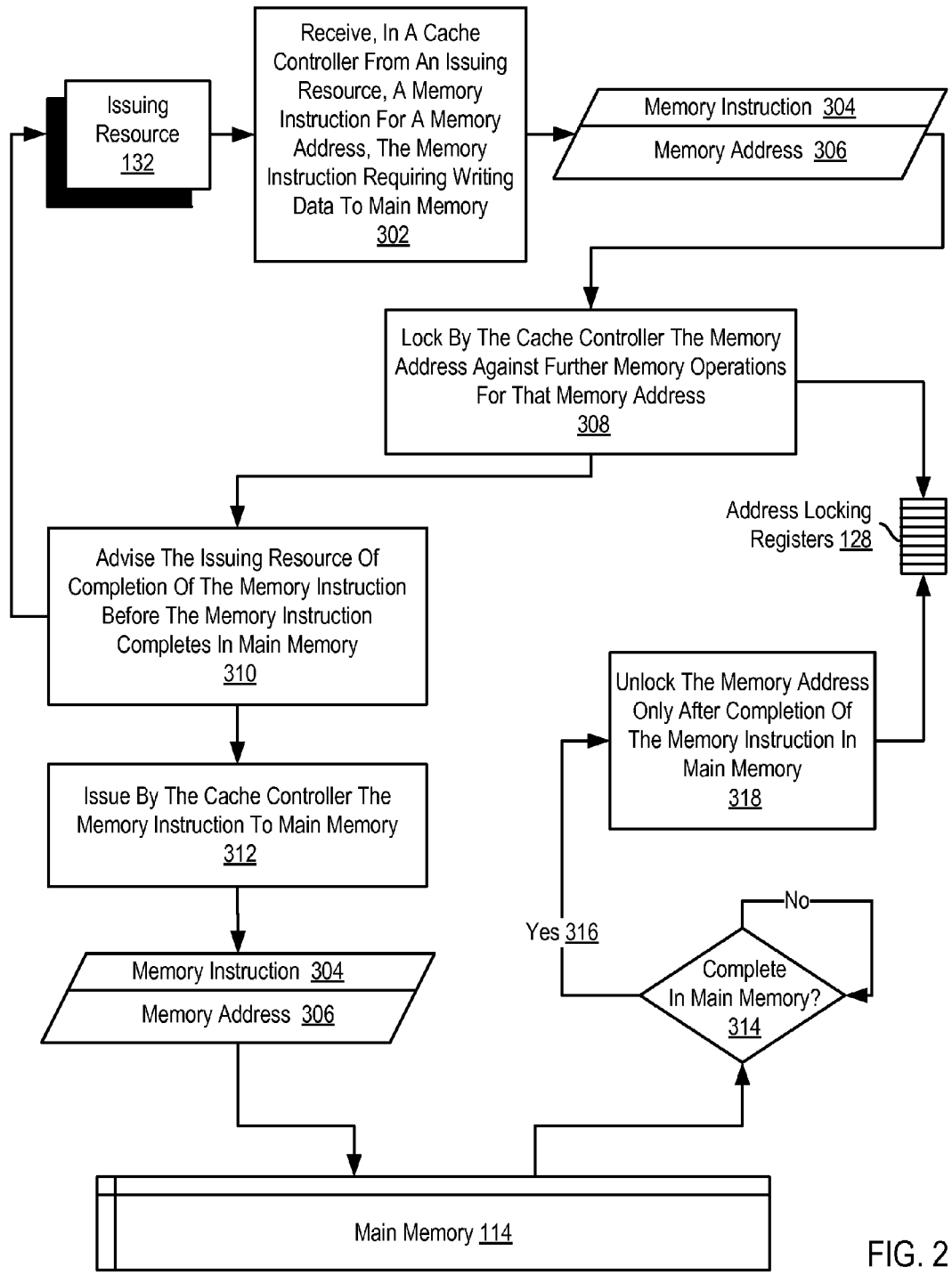
FIGS. 2-3 set forth flow charts illustrating a example methods of main memory operations in an SMP computer according to embodiments of the present invention.

For further explanation, FIG. 2 sets forth a flow chart illustrating an example method of main memory operations in an SMP computer according to embodiments of the present invention. The method of FIG. 2 is carried out on an SMP computer like the one illustrated and described above with reference to FIG. 1, so that FIG. 2 is described with reference to both FIG. 2 and also to FIG. 1. The method of FIG. 2 includes receiving (302), in a cache controller (110) from an issuing resource (132), a memory instruction (304) for a memory address (306), where the memory instruction (304) requires writing data to main memory (114). The method of FIG. 2 also includes locking (308) by the cache controller (110) the memory address (306) against further memory operations for the memory address, storing the memory address in one of the address locking registers (128). The method of FIG. 2 also includes advising (310) the issuing resource (132) of completion of the memory instruction (304) before the memory instruction completes in main memory. The method of FIG. 2 also includes issuing (312) by the cache controller (110) the memory instruction (304) to main memory (114) and unlocking (318) the memory address (306) only after completion (314, 316) of the memory instruction (304) in main memory (114).

Figure 3:
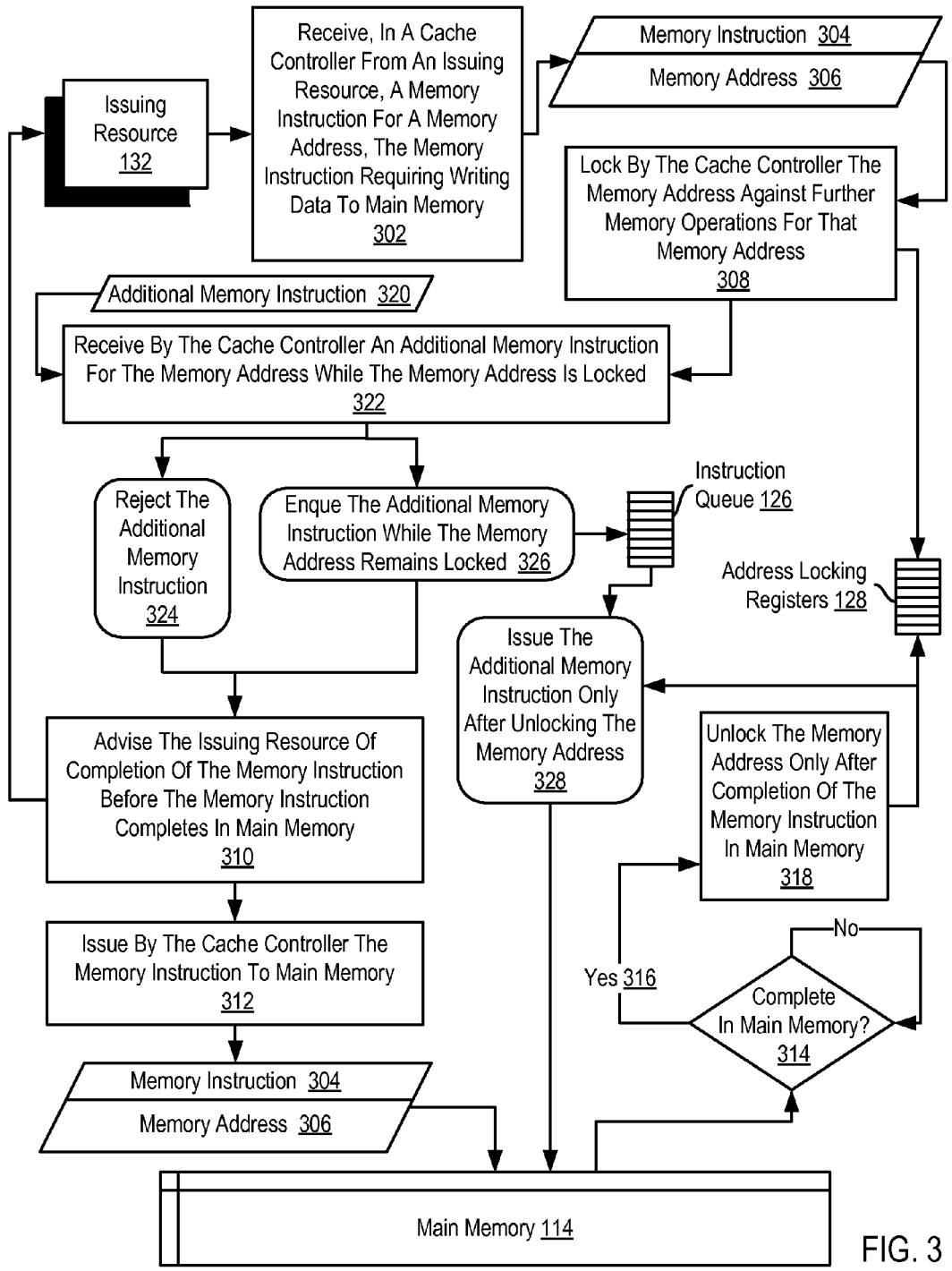

For further explanation, FIG. 3 sets forth a flow chart illustrating a further example method of main memory operations in an SMP computer according to embodiments of the present invention. Like the method of FIG. 2, the method of FIG. 3 is carried out on an SMP computer like the one illustrated and described above with reference to FIG. 1, so that FIG. 3 is described with reference to both FIG. 3 and also to FIG. 1. The method of FIG. 3 is similar to the method of FIG. 2, including as it does receiving (302) a memory instruction (304) for a memory address (306) that requires writing data to main memory (114), locking (308) the memory address (306), advising (310) the issuing resource (132) of completion of the memory instruction (304) before the memory instruction completes in main memory, issuing (312) the memory instruction (304) to main memory (114), and unlocking (318) the memory address (306) only after completion (314, 316) of the memory instruction (304) in main memory (114).

In addition, however, the method of FIG. 3 includes processing steps addressing the sequence of events in which the cache controller (110) receives (322) an additional memory instruction (320) for the memory address (306) while the memory address is still locked, that is, before the current memory instruction (304) is completed in main memory. The method of FIG. 3 includes two alternative ways of proceeding with the additional memory instruction (320). In one alternative, the method includes the alternative of rejecting (324) by the cache controller (110) the additional memory instruction entirely, requiring whatever issuing resource issued the additional instruction to reissue the additional instruction later, after the corresponding memory address is unlocked. In a second alternative, the method includes enqueing (326) the additional memory instruction in the cache controller while the memory address remains locked and issuing (328) the additional memory instruction to the main memory only after unlocking (318) the memory address.

Figure 4:
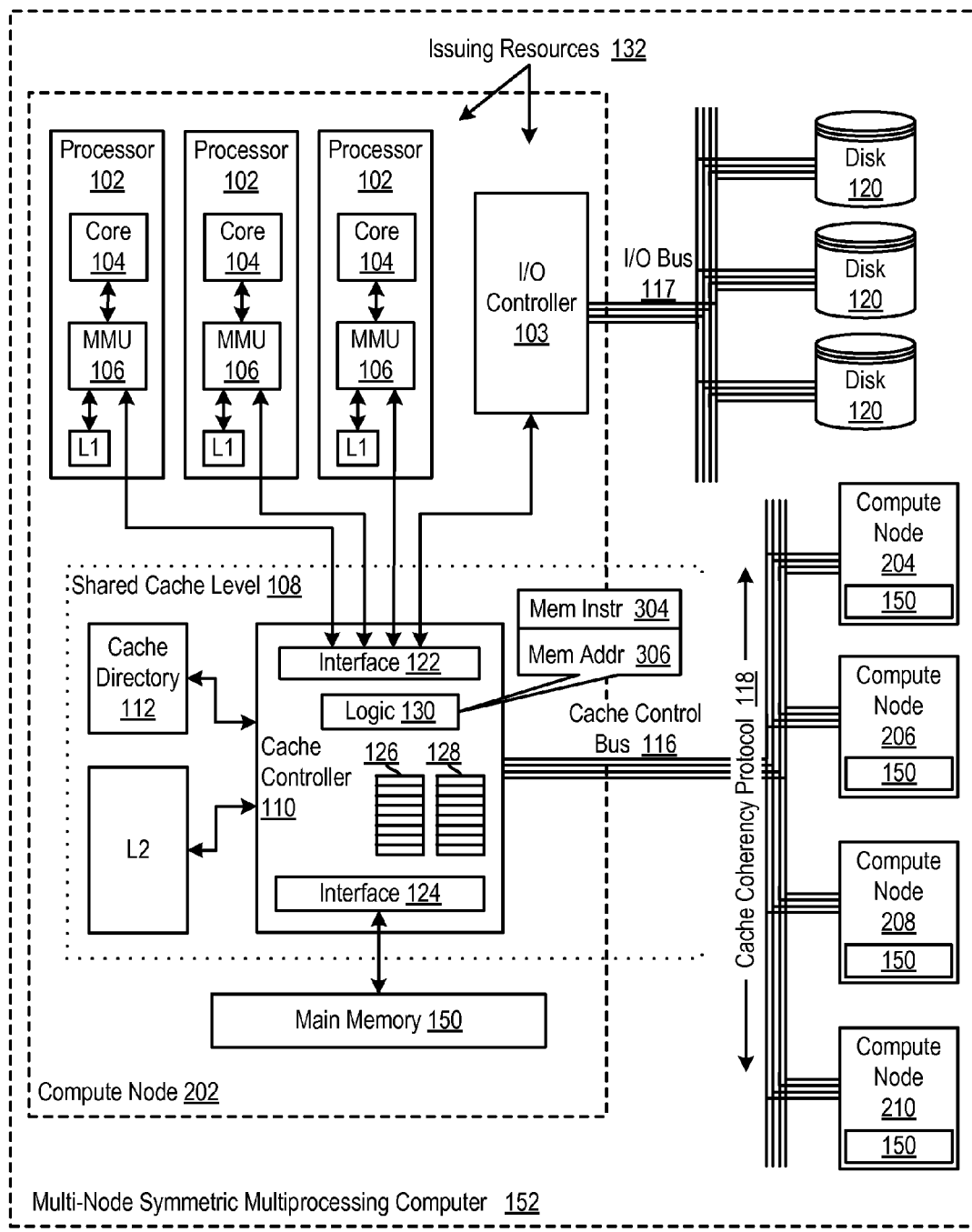
FIG. 4 sets forth a functional block diagram of an example of a multi-node SMP computer that conducts main memory operations according to embodiments of the present invention.

For further explanation, FIG. 4 sets forth a functional block diagram of an example of a multi-node, symmetric multiprocessing computer (152) that conducts main memory operations according to embodiments of the present invention. The example computer (152) of FIG. 4 includes several compute nodes (202, 204, 206, 208, 210). Actually the example of FIG. 4 illustrates a computer (152) with five compute nodes, but this number five is only for ease of explanation, not for limitation of the invention. Readers will recognize that multi-node SMP computers that implement main memory operations according to embodiments of the present invention can have any number of compute nodes. The IBM System z10™ series of mainframe computers, for example, each can include up to 64 compute nodes or, in z10 terminology, "frames." The IBM Blue Gene™ series of supercomputers can support thousands of compute nodes.

The diagram of one of the compute nodes (202) is expanded to illustrate the structure and components typical to all of the compute nodes. Each compute node includes a number of computer processors (102). The number of computer processors per compute node is illustrated here as three, but this is for ease of explanation, not for limitation. Readers will recognize that each compute node can include any number of computer processors as may occur to those of skill in the art. Each compute node in the IBM System z10 series of mainframe computers, for example, can include up to 64 processors.

Each processor (102) in the example of FIG. 4 includes a compute core (104) that is coupled for memory operations through a memory management unit ('MMU') (106) and a cache controller (110) to two caches L1 and L2, and to main memory (150). L1 is a relatively small, high speed cache fabricated into the processor itself. The MMU (106) includes address translation logic, a translation lookaside buffer, controls for the on-processor cache L1, and so on. The cache controller (110), with the L2 cache, a cache directory (112), and a cache control bus (116) bearing data communications among the compute nodes according to a cache coherency protocol (118), implements a shared cache level (108) across the compute nodes (202, 204, 206, 208, 210) of the computer.

The main memory (150) is the principal, random access store of program data and program instructions for data processing on the computer (152). Main memory (150) is characterized by memory latency, the time required for a memory access, a read or write to or from main memory. In this example, main memory (150) represents a single extent of physical address space, so that, from the point of view of any processor (102), there is only one main memory. But main memory is physically segmented and distributed across compute nodes, so that each compute node (202, 204, 206, 208, 210) has a separate segment of main memory (150) installed upon it. This architectural arrangement of main memory means that a main memory access from a processor on one compute to a main memory segment on the same compute node has smaller latency than an access to a segment of main memory on another compute node.

Each compute node contains a segment (150) of main memory organized according to hardware addresses, each of which can provide a cache line tag value. The data in each cache line resides in a segment of main memory on one of the compute nodes, and the compute node having the main memory segment where contents of a cache line are stored is said to have 'main memory affinity' for that cache line and for memory addresses within the cache line. A memory operation to or from a cache on a compute node having main memory affinity for an affected cache line will have the smallest latency of any memory operation on main memory. All memory operations to or from caches on compute nodes without memory affinity for an affected cache line will have larger latency than similar operations to or from main memory on a compute node having main memory affinity with the affected cache line. When a cache line is evicted by writing the cache line to main memory from a compute node without main memory affinity for the cache line, the cache line must be transmitted across the cache control bus (116) to the computer node having main memory affinity for the cache line before ultimately being written out to the segment of main memory on that compute node.

The caches L1 and L2 are specialized segments of memory used by the processors (102) to reduce memory access latency. Each cache is smaller and faster than main memory, and each cache stores copies of data from frequently used main memory locations. When a processor needs to read from or write to a location in main memory, it first checks whether a copy of that data, a "cache line," is in a cache. If so, the processor immediately reads from or writes to the cache, which is much faster than reading from or writing to main memory. As long as most memory accesses are cached memory locations, the average latency of memory accesses will be closer to the cache latency than to the latency of main memory. As mentioned, main memory is much slower than any cache, and cache misses extract a heavy toll in memory access latency.

Cache memory is organized in blocks of data referred to as 'cache lines.' Each cache line in different designs may range in size from 8 to 512 bytes or more. The size of a cache line typically is larger than the size of the usual access requested by a CPU instruction, which ranges from 1 to 16 bytes—the largest addresses and data typically handled by current 32 bit- and 64 bit-architectures being 128 bits or 16 bytes in length. Each cache line is characterized by a 'tag' composed of most significant bits of the beginning address where the contents of the cache line are stored in main memory. In the example of FIG. 4, caches L1 and L2 implement a multi-level cache with two levels. The example computer of FIG. 4 implements two cache levels, L1 and L2, but this is only for ease of explanation, not for limitation. Many computers implement additional levels of cache, three or even four cache levels. In the example of FIG. 4, the L2 cache is shared directly among the processors on a compute node and among processor on all compute nodes through cache controller (110) on each compute node, the cache control bus (116), and the cache coherency protocol (118).

The cache directory (112) is a repository of information regarding cache lines in the caches. The directory records, for each cache line in all of the caches on a compute node, the identity of the cache line or cache line "tag" and the cache line state, MODIFIED, SHARED, INVALID, and so on. The MMUs (106) and the cache controllers (110) consult and update the information in the cache directory with every cache operation on a compute node. The cache controller (110), connected directly to L2, has no direct connection to L1—and obtains information about cache lines in L1 from the cache directory (112).

The cache controller (110) is a logic circuit that manages cache memory, providing an interface among processors (102), caches, and main memory (150). Although the cache controller (110) here is represented externally to the processors (102), cache controllers are often integrated on modern computers directly into a processor or an MMU. In this example, the MMUs (106) in fact include cache control logic for the L1 caches.

In the example computer of FIG. 4, main memory operations that require writing data to main memory according to embodiments of the present invention take place in an overall context of cache coherence. "Cache coherence," as the term is used here, generally indicates:

A cache read by processor P to location X following a write by P to X, with no writes of X by any other processor between P's write and read instructions, must always return the value written by P. This requirement is a condition of program order preservation and is needed even in monoprocessed architectures.

A cache read by processor P1 to location X following a write by another processor P2 to X must return the value written by P2 if no other writes to X are made by any processor between the two accesses. This condition defines a coherent view of cache memory. If processors can read the same old value after the write by P2, the cache is incoherent.

Cache writes to the same location must be sequenced. In other words, if location X received two different values A and B, in this order, by any two processors, the processors can never read location X as B and then read it as A. The location X must be seen with values A and B in that order.

Cache coherence in caches distributed across compute nodes in the example computer of FIG. 4 is maintained through use of a communications protocols called a cache coherence protocol. There are a number of cache coherence protocols that can be adapted for use in main memory operations according to embodiments of the present invention. Such protocols are traditionally named according to the cache line states supported by the protocol. The MSI protocol, for example, supports cache line states of:

MODIFIED: A cache line in the MODIFIED cache line state has been modified in the cache. The data in the cache is then inconsistent with the backing store (e.g., main memory). A cache with a cache line in the "M" state has the responsibility to write the cache line to the backing store when the cache line is evicted.

SHARED: A cache line in the SHARED cache line state is unmodified and exists in at least one cache. The cache can evict the data without writing it to the backing store.

INVALID: A cache line in the INVALID state contains invalid data, and must be fetched from memory or another cache if the cache line is to be stored in this cache. Note that cache lines that are completely missing from a cache may also be characterized as INVALID in the cache.

The MESI protocol adds an EXCLUSIVE cache line state to the states of the MSI protocol. The MOESI protocol adds an OWNED cache line state to states of the MESI protocol. And so on.

The example computer (152) of FIG. 1 carries out main memory operations according to embodiments of the present invention generally as follows. The cache controller (110) receives from an issuing resource (132) a memory instruction (304) for a memory address (306). The memory instruction (302) is of a kind that requires writing data to main memory (150). Upon receiving the memory instruction, the cache controller (110) locks the memory address against further memory operations for the memory address by, for example, storing the address in an address locking register (128). The cache controller (110) then establishes cache coherence for the memory address by communications among the compute nodes according to a cache coherence protocol (118), using the cache coherence operations to identify a compute node having main memory affinity for the memory address. The cache controller (110) then advises the issuing resource (132) of completion of the memory instruction (304) before the memory instruction completes in main memory—doing so only after establishing cache coherence for the memory address. The cache controller then issues the memory instruction to main memory (150), issuing the memory instruction through the cache coherence protocol to a cache controller on the compute node having main memory affinity for the memory address. The cache controller then unlocks the memory address, by deleting it from the address locking register where it is stored, only after completion of the memory instruction in main memory (150).

Figure 5:
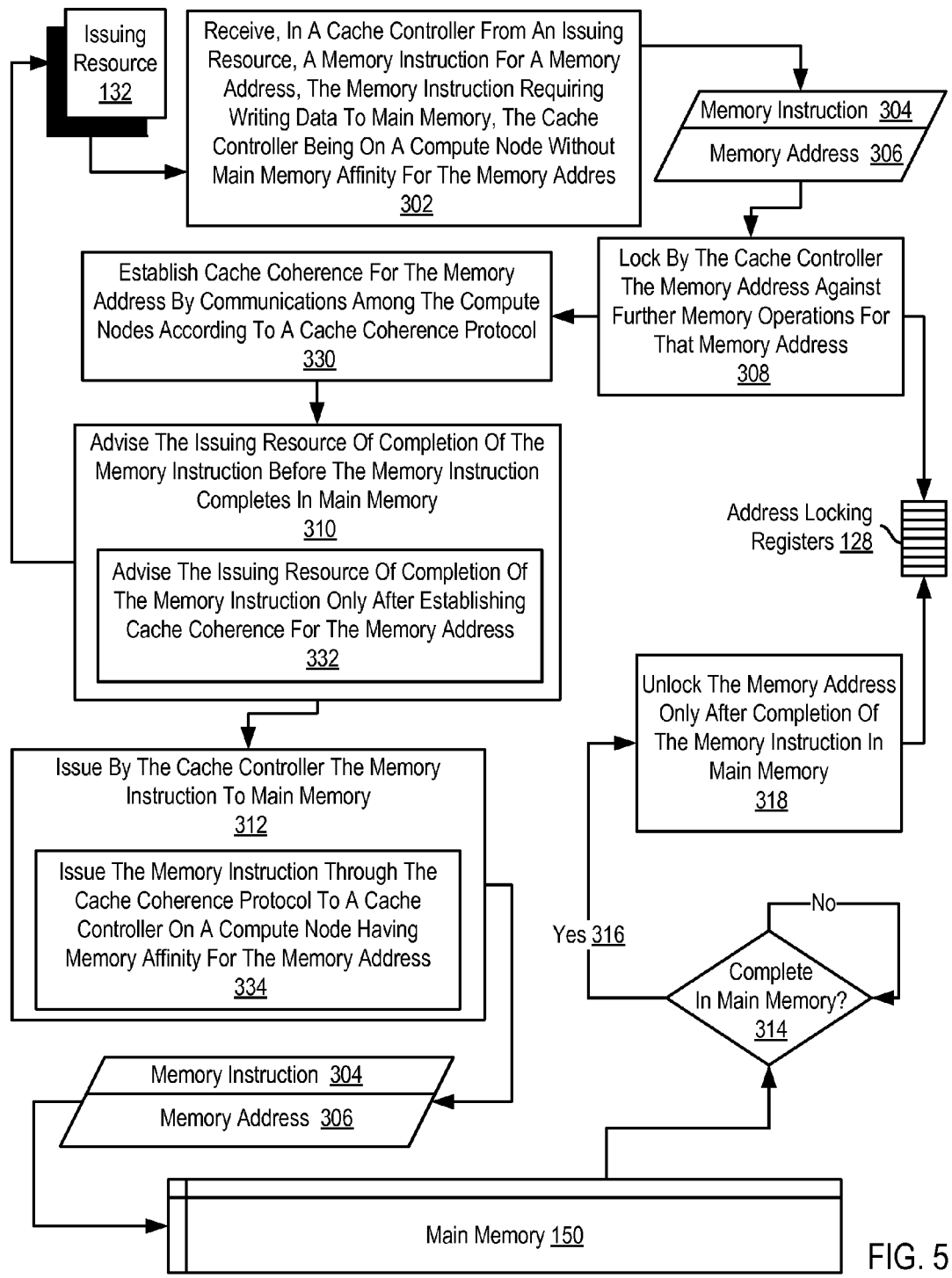
FIG. 5 sets forth a flow chart illustrating an example method of main memory operations in a multi-node SMP computer according to embodiments of the present invention.

For further explanation, FIG. 5 sets forth a flow chart illustrating an example method of main memory operations in a multi-node SMP computer according to embodiments of the present invention. The method of FIG. 5 is carried out on a multi-node SMP computer like the one illustrated and described above with reference to FIG. 4, so that FIG. 5 is described with reference to both FIG. 5 and also to FIG. 4. The method of FIG. 5 is similar to the method of FIG. 2, although adapted for the multi-node case, including as it does receiving (302) a memory instruction (304) for a memory address (306) that requires writing data to main memory (114), locking (308) the memory address (306), advising (310) the issuing resource (132) of completion of the memory instruction (304) before the memory instruction completes in main memory, issuing (312) the memory instruction (304) to main memory (150), and unlocking (318) the memory address (306) only after completion (314, 316) of the memory instruction (304) in main memory (150).

In the example of FIG. 5, however, the cache controller (110) receiving the memory instruction is on a compute node (202) without main memory affinity for the memory address. The segment of main memory containing the memory address is on one of the other compute nodes (204, 206, 208, 210). The method of FIG. 4 includes establishing (330) cache coherence for the memory address (304) by communications among the compute nodes according to a cache coherence protocol, thereby identifying a compute node having main memory affinity for the memory address, a process that is explained further with reference to FIGS. 6-9 below. In the method of FIG. 4, advising (310) the issuing resource (132) of completion of the memory instruction (304) also includes advising (332) the issuing resource (132) of completion of the memory instruction only after establishing (330) cache coherence for the memory address. Further in the method of FIG. 4, issuing (312) the memory instruction (304) to main memory (150) also includes issuing (334) the memory instruction (304) through the cache coherence protocol (118) to a cache controller on a compute node having main memory affinity for the memory address (306).

Figure 6:
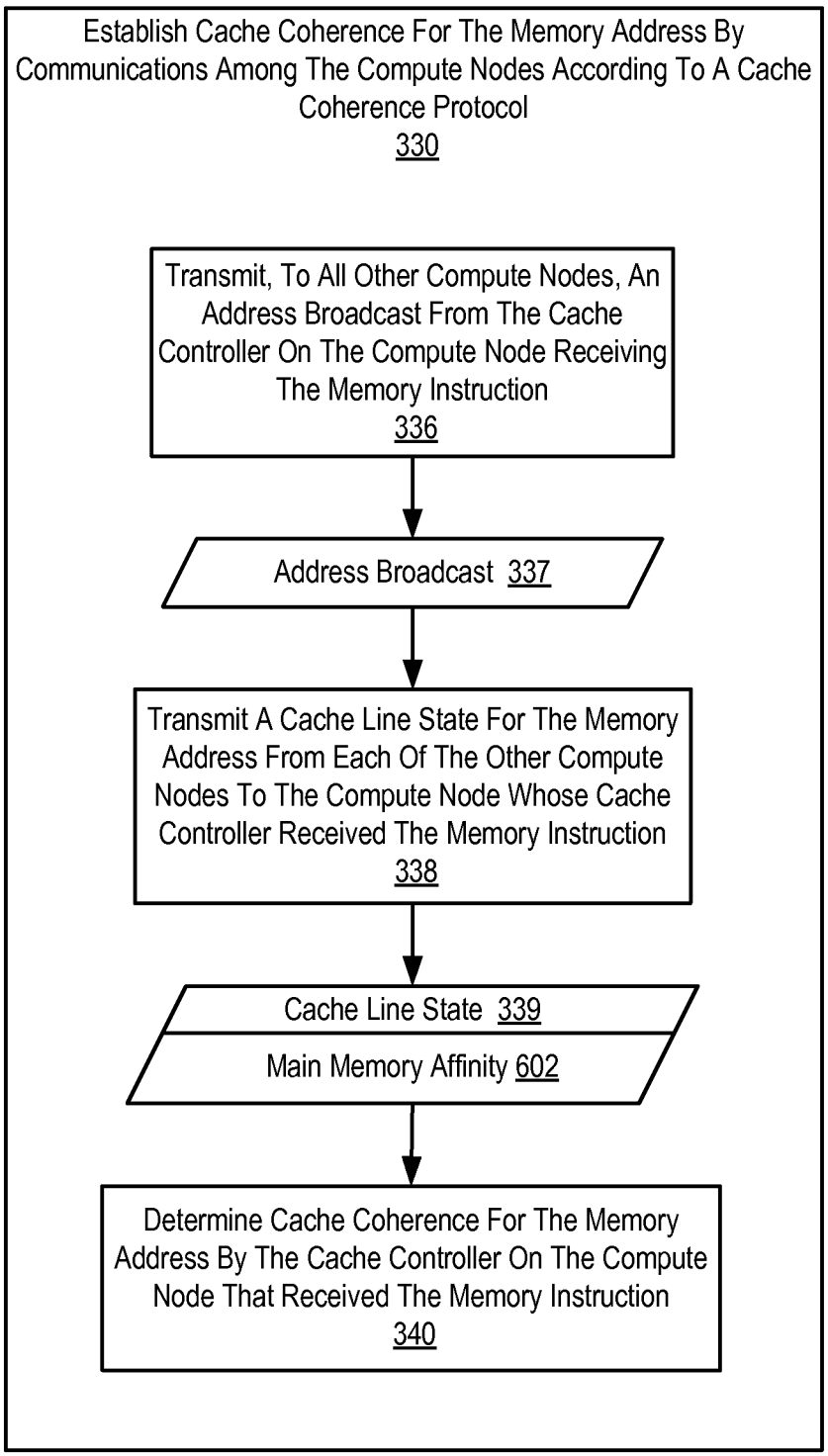
FIG. 6 sets forth a flow chart illustrating an example method of establishing cache coherence for the memory address in a main memory instruction that requires writing data to main memory.

For further explanation, FIG. 6 sets forth a flow chart illustrating an example method of establishing (330) cache coherence for the memory address in a main memory instruction that requires writing data to main memory. FIG. 6 is described with reference both to FIG. 6 and also to FIG. 4. The method of FIG. 6 includes transmitting (336), to all other compute nodes (204, 206, 208, 210), an address broadcast (337) from the cache controller (110) on the compute node (202) receiving the memory instruction (304). The address broadcast specifies the memory address in question and represents a request for cache line state for that memory address in each of the other compute nodes (204, 206, 208, 210) as well as main memory affinity for the memory address for each of the other compute nodes (204, 206, 208, 210).

The method of FIG. 6 also includes transmitting (338) a cache line state (339) for the memory address (306) from each of the other compute nodes (204, 206, 208, 210) to the compute node (202) whose cache controller (110) received the memory instruction (304). In this return transmission, at least one of the other compute nodes will indicate main memory affinity for the memory address (306), that is, the compute node whose segment of main memory (150) includes the memory address.

The method of FIG. 6 also includes determining (340) cache coherence for the memory address by the cache controller (110) on the compute node (202) that received the memory instruction (304). In this example, only the cache controller that issues the address broadcast runs the algorithm to determine cache coherence, in the process, determining what changes in cache line state need to be effected on other compute nodes to establish coherence. To the extent, for example, that caches on other compute nodes are in possession of copies of the cache line containing the pertinent memory address, those cache lines may need to be invalidated when the calling cache controller writes data to that memory address. After so establishing cache coherence for the memory address (306), the cache controller (202) that received the subject memory instruction (304) locks the memory address and issues the main memory instruction to the cache controller on the compute node having main memory affinity for the memory address.

Figure 7:
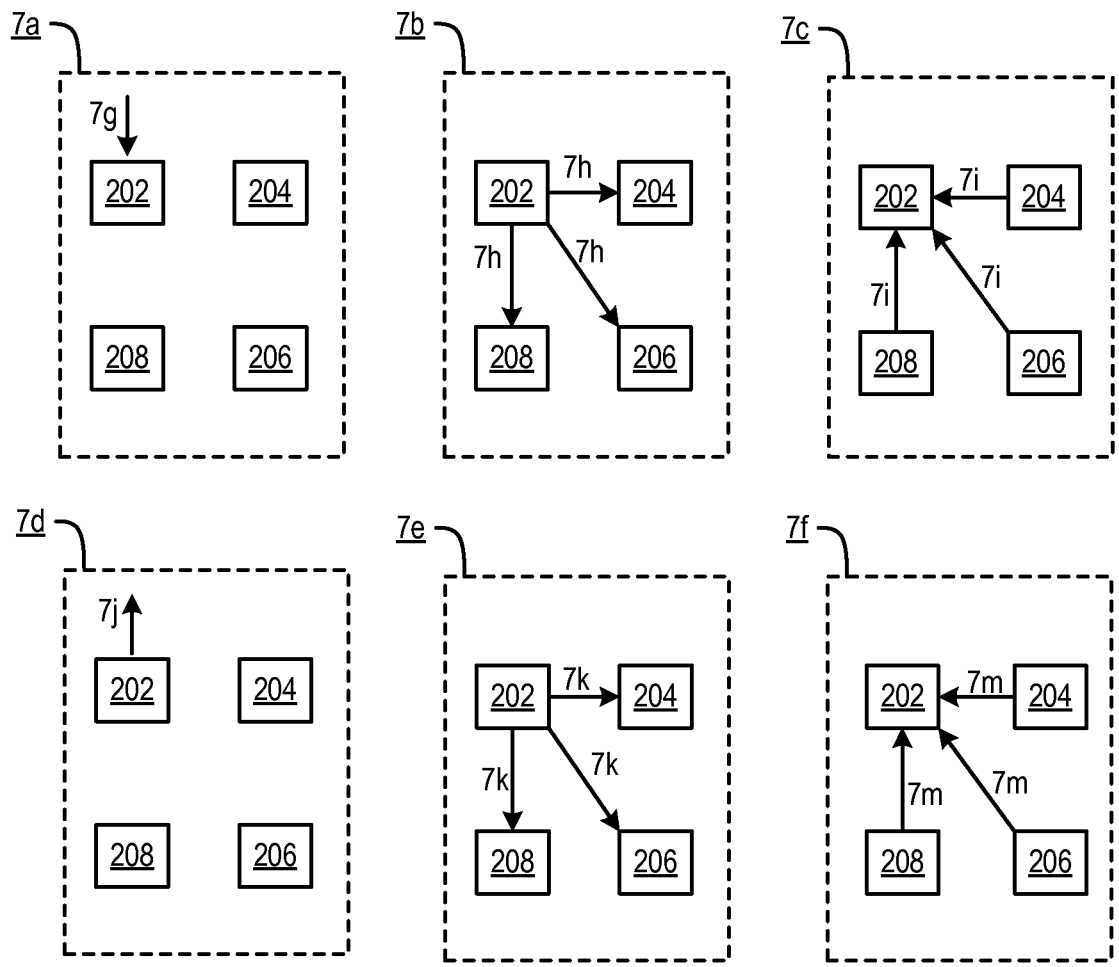
FIG. 7 sets forth a block diagram illustrating an example sequence of data processing steps in establishing cache coherence for a memory address in a main memory instruction that requires writing data to main memory.

For further explanation, FIG. 7 diagrams the method of FIG. 6. That is, FIG. 7 sets forth a block diagram illustrating an example sequence of data processing steps in establishing cache coherence for a memory address in a main memory instruction that requires writing data to main memory. The sequence diagram of FIG. 7 is described with reference both to FIG. 7 and also to FIG. 4. In the example of FIG. 7, in step (7a), a cache controller on compute node (202) receives (7g) from an issuing resource (132), a memory instruction (304) for a memory address (306), where the memory instruction (304) requires writing data to main memory (150) and the compute node (202) has no memory affinity for the memory address (306). In step (7b), the cache controller (110) in compute node (202) begins a process of establishing cache coherence for the memory address by transmitting, to all other compute nodes (204, 206, 208), an address broadcast (7h). The address broadcast (7h) specifies the memory address in question and represents a request for cache line state for that memory address in each of the other compute nodes (204, 206, 208) as well as main memory affinity for the memory address for each of the other compute nodes (204, 206, 208).

In sequence step (7c), the cache controllers (110) in all other nodes (204, 206, 208) transmit a cache line state (7i) for the memory address (306) from each of the other compute nodes (204, 206, 208) to the compute node (202) whose cache controller (110) received the memory instruction (304). In this return transmission (7i), at least one of the other compute nodes (204, 206, 208) will indicate main memory affinity for the memory address (306), that is, the compute node whose segment of main memory (150) includes the memory address. In sequence step (7d), the cache controller (110) on the compute node (202) that received the memory instruction (304), now having all pertinent information from all the other nodes regarding cache line state and main memory affinity, determines cache coherence for the memory address. In this example, only the cache controller (110) that issues the address broadcast (7h) runs the algorithm to determine cache coherence, in the process, determining what changes in cache line state need to be effected on other compute nodes to establish coherence and, at this point in processing, having all information pertinent to cache coherence and therefore effectively establishing cache coherence for the memory address, advising (7j) the issuing resource (132) of completion of the memory instruction (304).

After so establishing cache coherence for the memory address (306), the cache controller (202) that received the subject memory instruction (304) locks the memory address and issues the main memory instruction to the cache controller on the compute node having main memory affinity for the memory address. To the extent that caches on other compute nodes are in possession of copies of the cache line containing the pertinent memory address, those cache lines may need to be invalidated when the calling cache controller writes data to that memory address. In sequence step (7k), therefore, the cache controller (110) in the compute node (202) that received the memory instruction (304), transmits a further coherence message (7k) to the other compute nodes (204, 206, 208) indicating which further steps regarding cache coherence are to be taken by the cache controllers on the other compute nodes. And in step (7f), the other compute nodes (204, 206, 208) transmit a return coherence message confirming that the other compute nodes have completed all pertinent cache coherence processing.

Figure 8:
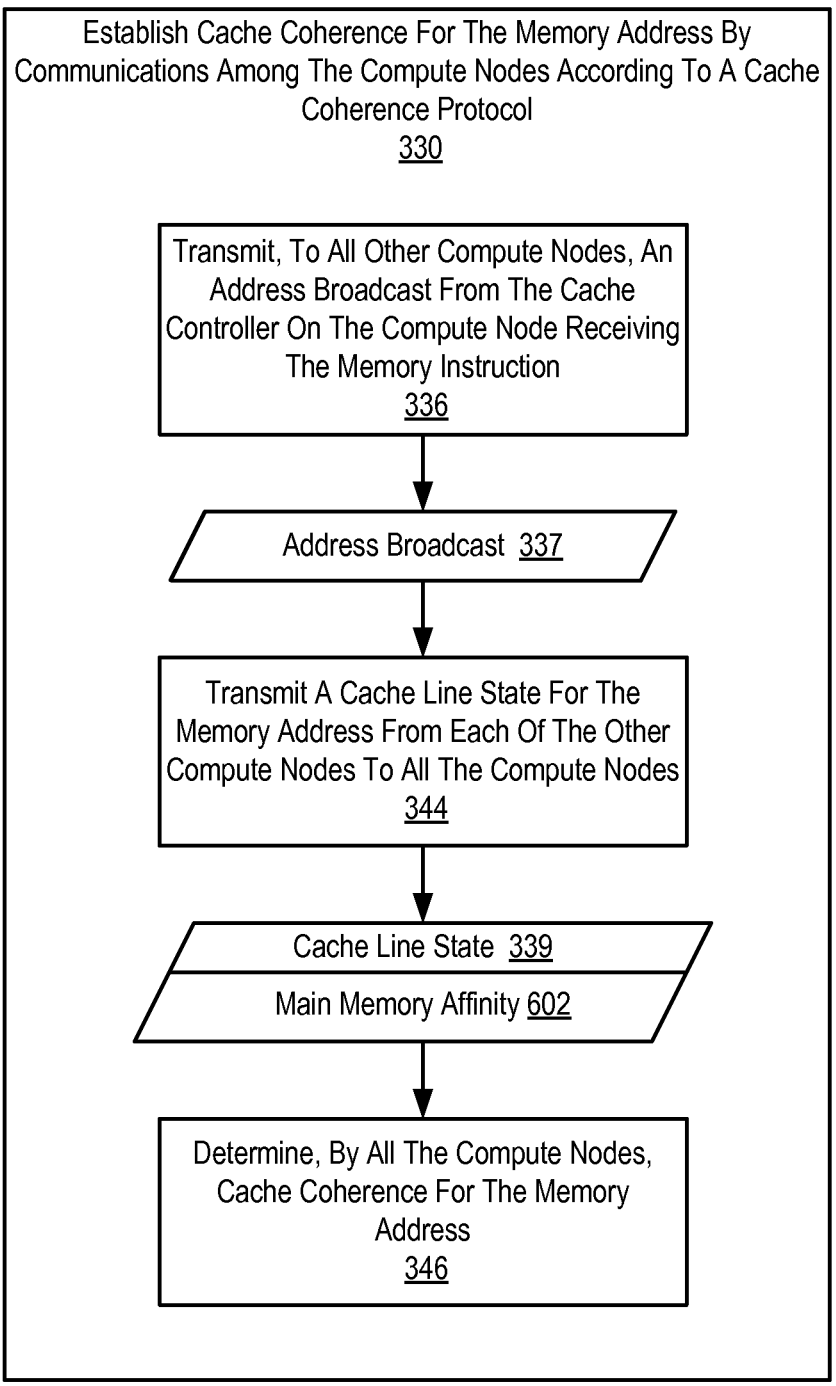
FIG. 8 sets forth a flow chart illustrating a further example method of establishing cache coherence for the memory address in a main memory instruction that requires writing data to main memory.

For further explanation, FIG. 8 sets forth a flow chart illustrating an example method of establishing (330) cache coherence for the memory address in a main memory instruction that requires writing data to main memory. FIG. 8 is described with reference both to FIG. 8 and also to FIG. 4. The method of FIG. 8 includes transmitting (336), to all other compute nodes (204, 206, 208, 210), an address broadcast (337) from the cache controller (110) on the compute node (202) receiving the memory instruction (304). The address broadcast specifies the memory address in question and represents a request for cache line state for that memory address in each of the other compute nodes (204, 206, 208, 210) as well as main memory affinity for the memory address for each of the other compute nodes (204, 206, 208, 210).

The method of FIG. 8 also includes transmitting (344) a cache line state (339) for the memory address (306) from each of the other compute nodes (204, 206, 208, 210) to all the compute nodes (202, 204, 206, 208, 210), in effect a kind of "all-to-all" transmission. Certainly viewed with the address broadcast (337), the effect is all-to-all because the address broadcast also includes cache line state for the memory address in the compute node that issues the address broadcast. In this all-to-all transmission, at least one of the other compute nodes (204, 206, 208, 210) will indicate to all compute nodes (202, 204, 206, 208, 210) main memory affinity for the memory address (306), that is, the compute node whose segment of main memory (150) includes the memory address.

The method of FIG. 8 also includes determining (346), by all the compute nodes (202, 204, 206, 208, 210), cache coherence for the memory address. In this example, all cache controllers (110) on all compute nodes (202, 204, 206, 208, 210) are provided with all pertinent cache coherence information, cache line states (339), main memory affinity (602), and so on, and all of the cache controllers run the algorithm to determine cache coherence, in the process, determining what changes in cache line state need to be effected on each compute node to establish coherence. To the extent, for example, that a cache controller on any compute node is in possession of a copy of the cache line containing the pertinent memory address, the determination whether to invalidate those cache lines is made by each cache controller independently. After so establishing cache coherence for the address, the cache controller that received the subject memory instruction locks the memory address and issues the main memory instruction to the cache controller on the compute node having main memory affinity for the memory address.

Figure 9:
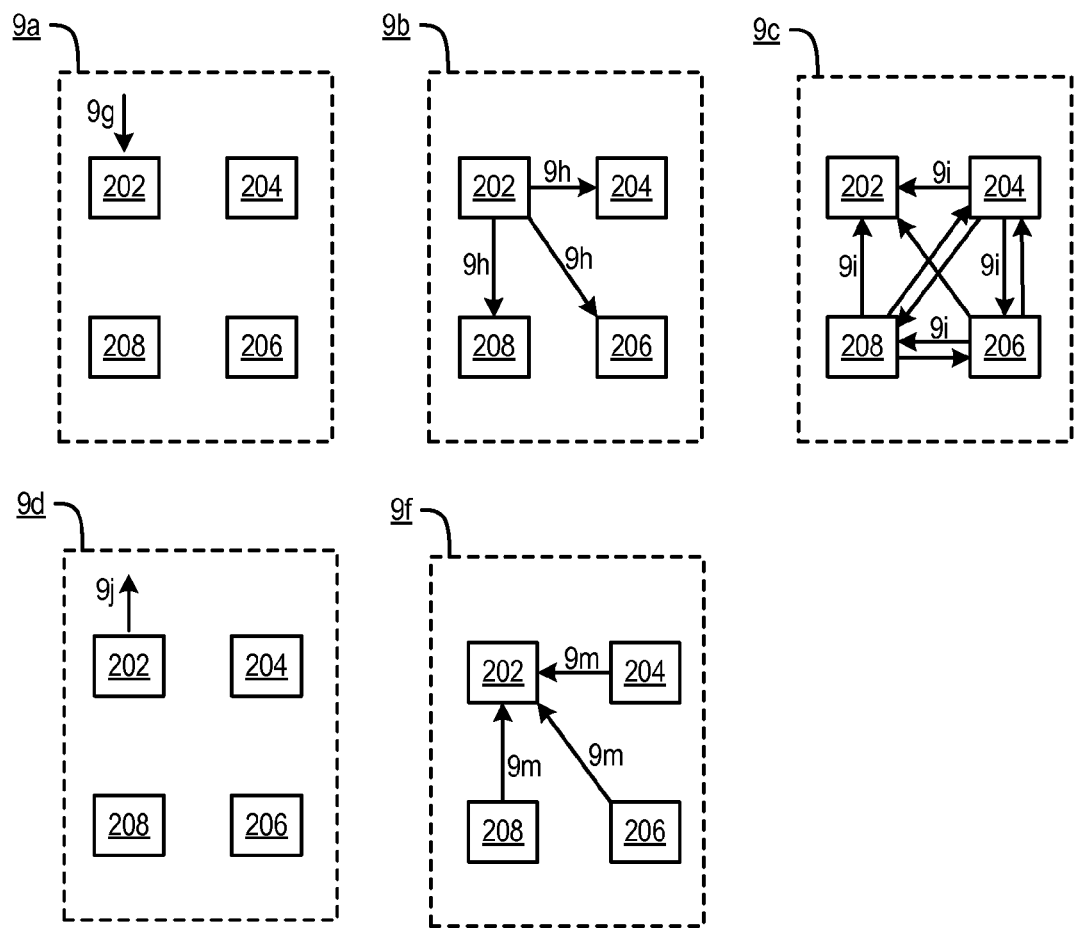
FIG. 9 sets forth a block diagram illustrating a further example sequence of data processing steps in establishing cache coherence for a memory address in a main memory instruction that requires writing data to main memory.

For further explanation, FIG. 9 diagrams the method of FIG. 8. That is, FIG. 9 sets forth a block diagram illustrating an example sequence of data processing steps in establishing cache coherence for a memory address in a main memory instruction that requires writing data to main memory. The sequence diagram of FIG. 9 is described with reference both to FIG. 9 and also to FIG. 4. In the example of FIG. 9, in step (9a), a cache controller on compute node (202) receives (9g) from an issuing resource (132), a memory instruction (304) for a memory address (306), where the memory instruction (304) requires writing data to main memory (150) and the compute node (202) has no memory affinity for the memory address (306). In step (9b), the cache controller (110) in compute node (202) begins a process of establishing cache coherence for the memory address by transmitting, to all other compute nodes (204, 206, 208), an address broadcast (9h). The address broadcast (9h) specifies the memory address in question and represents a request for cache line state for that memory address in each of the other compute nodes (204, 206, 208) as well as main memory affinity for the memory address for each of the other compute nodes (204, 206, 208).

In sequence step (9c), the cache controllers (110) in all other nodes (204, 206, 208) transmit a cache line state (9i) for the memory address (306) from each of the other compute nodes (204, 206, 208) to all the compute nodes (202, 204, 206, 208), in effect a kind of "all-to-all" transmission. Certainly viewed with the address broadcast (9h), the effect is all-to-all because the address broadcast also includes cache line state for the memory address in the compute node (202) that issues the address broadcast (9h). In this all-to-all transmission, at least one of the other compute nodes (204, 206, 208) will indicate to all compute nodes (202, 204, 206, 208) main memory affinity for the memory address (306), that is, the compute node whose segment of main memory (150) includes the memory address. Further in sequence step (9c) all compute nodes (202, 204, 206, 208) determine cache coherence for the memory address (306). In this example, all cache controllers (110) on all compute nodes (202, 204, 206, 208) are provided with all pertinent cache coherence information, cache line states, main memory affinity, and so on, and all of the cache controllers run the algorithm to determine cache coherence, in the process, determining what changes in cache line state need to be effected on each compute node to establish coherence. To the extent, for example, that a cache controller on any compute node is in possession of a copy of the cache line containing the pertinent memory address, the determination whether to invalidate those cache lines is made by each cache controller independently.

In sequence step (9d), with cache coherence now established by all compute nodes including the compute node (202) that received the memory instruction (304), the cache controller (110) on the compute node (202) that received the memory instruction (304) advises (9j) the issuing resource (132) of completion of the memory instruction (304). The cache controller (202) that received the subject memory instruction (304) then locks the memory address and issues the main memory instruction (304) to the cache controller on the compute node having main memory affinity for the memory address. And in step (9f), the other compute nodes (204, 206, 208) transmit a return coherence message confirming that the other compute nodes have completed all pertinent cache coherence processing. In the example of FIG. 9 where all cache controllers have all coherence information and all cache controllers make their own decisions, there is no need for a step like (7e) on FIG. 7 where one controller tells other controllers what to do regarding cache coherence.

Example embodiments of the present invention are described largely in the context of a fully functional computer system. Readers will recognize, however, that the present invention also may be embodied in a computer program product disposed upon computer readable storage media for use with any suitable data processing system, such as, for example, the computer readable media illustrated as an optical disk (60) on FIG. 10. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by those skilled in the art, aspects of the present invention may be embodied as a system, that is, as apparatus, method, or computer program product. Accordingly, aspects or embodiments of the present invention may take the form of an entirely hardware embodiment, embodiments that are at least partly software (including firmware, resident software, micro-code, and the like), with embodiments combining software and hardware aspects that may generally be referred to herein as a "circuit," "module," "apparatus," or "system." Furthermore, aspects of the present invention may take the form of a computer program product embodied in one or more computer readable media (e.g., optical disk (60) on FIG. 10) having computer readable program code embodied thereon.

Any combination of one or more computer readable media may be utilized. A computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 10:
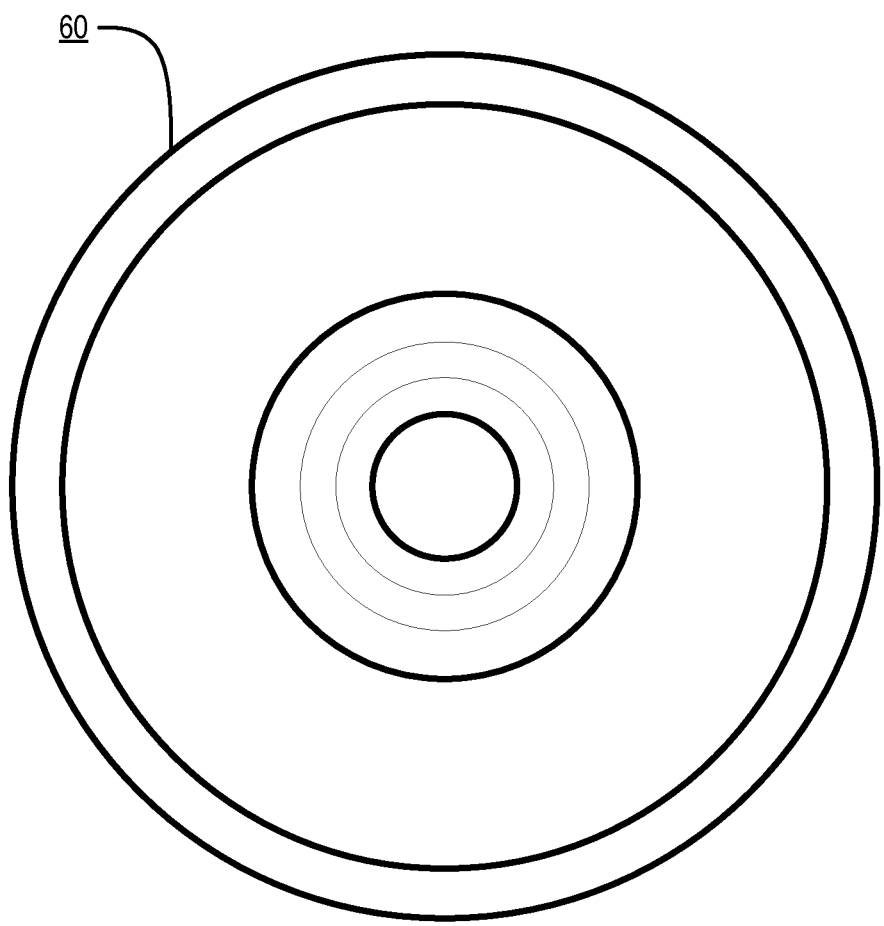
FIG. 10 sets forth a line drawing of an example computer program product according to embodiments of the present invention.

These computer program instructions may also be stored in a computer readable medium that can direct a computer, other programmable data processing apparatus, or other devices to function in a particular manner, such that the instructions stored in the computer readable medium produce an article of manufacture (e.g., optical disk (60) on FIG. 10) including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in a flowchart or block diagram may represent a module, segment, or portion of code or other automated computing machinery, which comprises one or more executable instructions or logic blocks for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of main memory operation in a multi-node symmetric multiprocessing computer, the computer comprising a plurality of compute nodes, each compute node comprising at least one processor operatively coupled through a cache controller to at least one cache of main memory, the main memory shared among and segmented across the compute nodes, and each cache controller coupled for data communications to cache controllers on other compute nodes, the method comprising:

receiving, in the cache controller from an issuing resource, a memory instruction for a memory address, the memory instruction requiring writing data to main memory; wherein the cache controller receiving the memory instruction is on a compute node without main memory affinity for the memory address;

locking by the cache controller the memory address against further memory operations for the memory address;

establishing cache coherence for the memory address by communications among the compute nodes according to a cache coherence protocol, wherein establishing cached coherence for the memory address comprises identifying a compute node with main memory affinity for the memory address; wherein identifying the compute node with main memory affinity for the memory address comprises receiving a transmission from the compute node with main memory affinity for the memory address indicating the main memory affinity;

advising the issuing resource of completion of the memory instruction only after establishing cache coherence for the memory address, after the identifying the compute node with main memory affinity for the memory address, and before the memory instruction completes in main memory;

issuing by the cache controller the memory instruction to main memory including issuing the memory instruction through the cache coherence protocol to a cache controller on the compute node having main memory affinity for the memory address; and unlocking the memory address only after completion of the memory instruction in main memory.

2. The method of claim 1 further comprising:
receiving by the cache controller an additional memory instruction for the memory address while the memory address is locked; and
rejecting by the cache controller the additional memory instruction.

3. The method of claim 1 further comprising:
receiving by the cache controller an additional memory instruction for the memory address while the memory address is locked; and
enqueing the additional memory instruction in the cache controller while the memory address remains locked; and
issuing the additional memory instruction to the main memory only after unlocking the memory address.

4. The method of claim 1 wherein establishing cache coherence further comprises:
transmitting, to all other compute nodes, an address broadcast from cache controller on the compute node receiving the memory instruction;
transmitting a cache line state for the memory address from each of the other compute nodes to the compute node receiving the memory instruction; and
determining cache coherence for the memory address by the compute node receiving the memory instruction.

5. The method of claim 1 wherein establishing cache coherence further comprises:
transmitting, to all other compute nodes, an address broadcast from cache controller on the compute node receiving the memory instruction;
transmitting a cache line state for the memory address from each of the other compute nodes to all the compute nodes; and
determining, by all the compute nodes, cache coherence for the memory address.

6. A multi-node symmetric multiprocessing computer comprising a plurality of compute nodes, each compute node comprising at least one processor operatively coupled through a cache controller to at least one cache of main memory, the main memory shared among and segmented across the compute nodes, and each cache controller coupled for data communications to cache controllers on other compute nodes, the computer further comprising input/output ('I/O') resources, the cache controller configured to function by:
- receiving, in the cache controller from an issuing resource, a memory instruction for a memory address, the memory instruction requiring writing data to main memory; wherein the cache controller receiving the memory instruction is on a compute node without main memory affinity for the memory address;
- locking by the cache controller the memory address against further memory operations for the memory address;
- establishing cache coherence for the memory address by communications among the compute nodes according to a cache coherence protocol, wherein establishing cached coherence for the memory address comprises identifying a compute node with main memory affinity for the memory address; wherein identifying the compute node with main memory affinity for the memory address comprises receiving a transmission from the compute node with main memory affinity for the memory address indicating the main memory affinity;
- advising the issuing resource of completion of the memory instruction only after establishing cache coherence for the memory address, after the identifying the compute node with main memory affinity for the memory address, and before the memory instruction completes in main memory;
- issuing by the cache controller the memory instruction to main memory including issuing the memory instruction through the cache coherence protocol to a cache controller on the compute node having main memory affinity for the memory address; and
- unlocking the memory address only after completion of the memory instruction in main memory.

7. The computer of claim 6 wherein the cache controller is further configured to function by:
- receiving by the cache controller an additional memory instruction for the memory address while the memory address is locked; and
- rejecting by the cache controller the additional memory instruction.

8. The computer of claim 6 wherein the cache controller is further configured to function by:
- receiving by the cache controller an additional memory instruction for the memory address while the memory address is locked; and
- enqueing the additional memory instruction in the cache controller while the memory address remains locked; and
- issuing the additional memory instruction to the main memory only after unlocking the memory address.

9. The computer of claim 6 wherein establishing cache coherence further comprises:
- transmitting, to all other compute nodes, an address broadcast from cache controller on the compute node receiving the memory instruction;
- transmitting a cache line state for the memory address from each of the other compute nodes to the compute node receiving the memory instruction; and
- determining cache coherence for the memory address by the compute node receiving the memory instruction.

10. The computer of claim 6 wherein establishing cache coherence further comprises:
- transmitting, to all other compute nodes, an address broadcast from cache controller on the compute node receiving the memory instruction;
- transmitting a cache line state for the memory address from each of the other compute nodes to all the compute nodes; and
- determining, by all the compute nodes, cache coherence for the memory address.

11. A computer program product for main memory operation in a multi-node symmetric multiprocessing computer, the computer comprising a plurality of compute nodes, each compute node comprising at least one processor operatively coupled through a cache controller to at least one cache of main memory, the main memory shared among and segmented across the compute nodes, and each cache controller coupled for data communications to cache controllers on other compute nodes, the computer further comprising input/output ('I/O') resources, the computer program product disposed upon a computer readable storage medium, wherein the computer readable storage medium is not a signal, the computer program product comprising computer program instructions which when executed by the cache controller cause the cache controller to function by:
- receiving, in the cache controller from an issuing resource, a memory instruction for a memory address, the memory instruction requiring writing data to main memory; wherein the cache controller receiving the memory instruction is on a compute node without main memory affinity for the memory address;
- locking by the cache controller the memory address against further memory operations for the memory address;
- establishing cache coherence for the memory address by communications among the compute nodes according to a cache coherence protocol, wherein establishing cached coherence for the memory address comprises identifying a compute node with main memory affinity for the memory address; wherein identifying the compute node with main memory affinity for the memory address comprises receiving a transmission from the compute node with main memory affinity for the memory address indicating the main memory affinity;
- advising the issuing resource of completion of the memory instruction only after establishing cache coherence for the memory address, after the identifying the compute node with main memory affinity for the memory address, and before the memory instruction completes in main memory;
- issuing by the cache controller the memory instruction to main memory including issuing the memory instruction through the cache coherence protocol to a cache controller on the compute node having main memory affinity for the memory address; and
- unlocking the memory address only after completion of the memory instruction in main memory.

12. The computer program product of claim 11 further comprising:
- receiving by the cache controller an additional memory instruction for the memory address while the memory address is locked; and
- rejecting by the cache controller the additional memory instruction.

13. The computer program product of claim 11 further comprising:
- receiving by the cache controller an additional memory instruction for the memory address while the memory address is locked; and
- enqueing the additional memory instruction in the cache controller while the memory address remains locked; and
- issuing the additional memory instruction to the main memory only after unlocking the memory address.

14. The computer program product of claim 11 wherein establishing cache coherence further comprises:
- transmitting, to all other compute nodes, an address broadcast from cache controller on the compute node receiving the memory instruction;
- transmitting a cache line state for the memory address from each of the other compute nodes to the compute node receiving the memory instruction; and
- determining cache coherence for the memory address by the compute node receiving the memory instruction.

15. The computer program product of claim 11 wherein establishing cache coherence further comprises:
- transmitting, to all other compute nodes, an address broadcast from cache controller on the compute node receiving the memory instruction;
- transmitting a cache line state for the memory address from each of the other compute nodes to all the compute nodes; and
- determining, by all the compute nodes, cache coherence for the memory address.

* * * * *